United States Patent [19]

Lewis

[11] 4,147,932
[45] Apr. 3, 1979

[54] LOW LIGHT LEVEL AND INFRARED VIEWING SYSTEM

[75] Inventor: John H. Lewis, Los Angeles, Calif.

[73] Assignee: Xonics, Inc., Van Nuys, Calif.

[21] Appl. No.: 830,787

[22] Filed: Sep. 6, 1977

[51] Int. Cl.² ............... H01J 31/49; G03G 13/00; H01J 31/50

[52] U.S. Cl. ............... 250/330; 250/315 R; 250/315 A; 250/331

[58] Field of Search ............... 250/315 A, 315 R, 330, 250/331; 350/362

[56] References Cited

U.S. PATENT DOCUMENTS

| | | | |
|---|---|---|---|
| 3,668,106 | 6/1972 | Ota | 350/362 |
| 3,965,352 | 6/1976 | Allan et al. | 250/315 A |

Primary Examiner—Alfred E. Smith
Assistant Examiner—Janice A. Howell
Attorney, Agent, or Firm—Harris, Kern, Wallen & Tinsley

[57] ABSTRACT

A viewing system for improving an image, and particularly designed for use with infrared and low light level inputs. A viewing system having first and second electrodes mounted in spaced relation with a gap therebetween, an electric power source for producing an electric field in the gap attracting electrons toward one electrode and positive charge toward the other, a photoresponsive layer on the gap face of the first electrode with radiation directed onto the layer through the first electrode producing an electrostatic charge image at the gap, and a plurality of electrophoretic particles dispersed in a dielectric liquid in the gap, with the particles being selectively deposited at the second electrode as a function of the electrostatic charge image. In the preferred embodiment, the deposited particles are viewed with a dark field illumination system whereby light is scattered to the viewing position by the deposited particles. Cascaded systems and systems incorporating image intensifiers are also disclosed.

25 Claims, 12 Drawing Figures

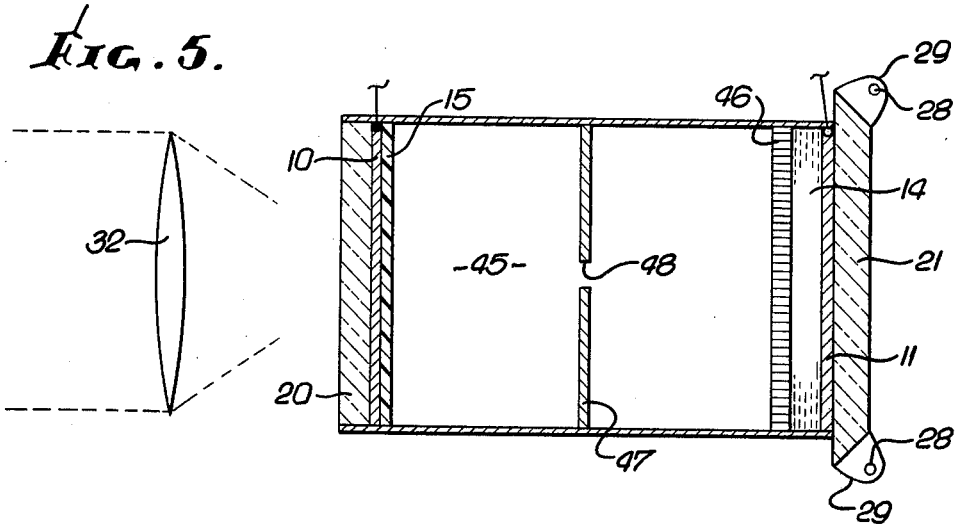
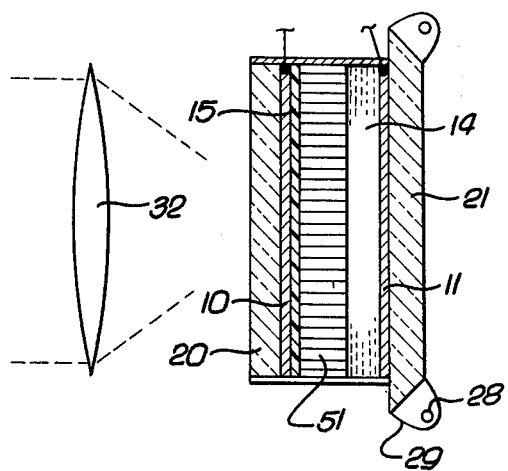
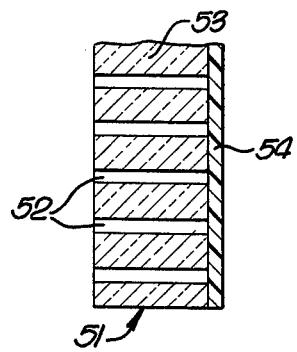
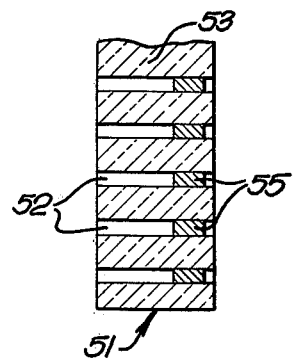
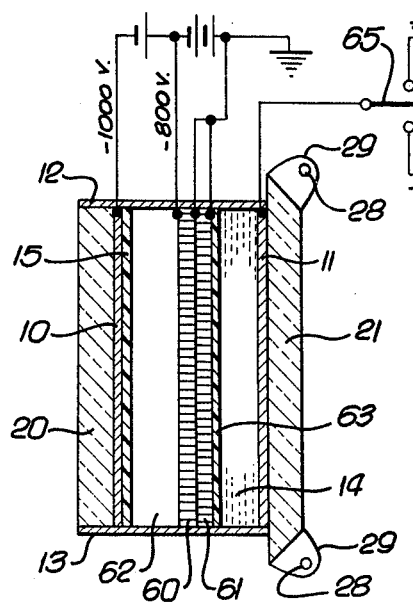
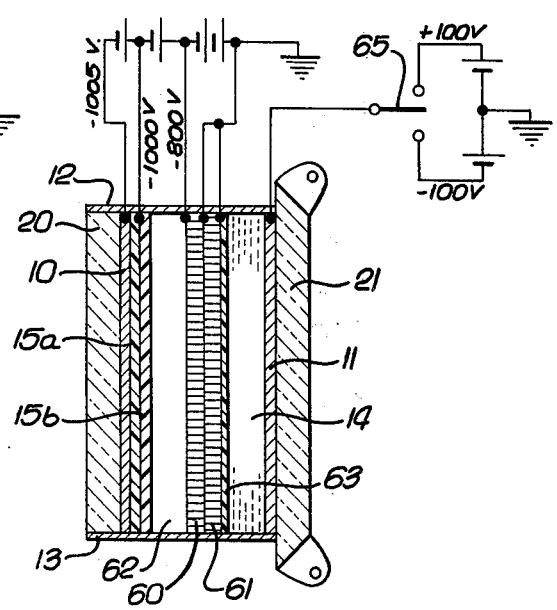

LOW LIGHT LEVEL AND INFRARED VIEWING SYSTEM

BACKGROUND OF THE INVENTION

This invention relates to viewing systems suitable for operation in dark or in dimly lit surroundings, using infrared or low level visible light as the input. The purpose of the system is to provide high gain to make a faint visible image or an infrared image readily seen as a visible image for direct viewing, copying, storing, transmitting and the like.

Devices generally known as image intensifiers are used for this purpose at the present time. These devices utilize phosphors for producing an intensified visible image and encounter severe limitations on gain and noise. Typically the gain per unit is less than 500 and a plurality of units will be used in cascade to provide the necessary output intensity. Accordingly, it is an object of the present invention to provide a new and improved viewing system for use with low radiation level inputs which will have relatively low noise and relatively high gain permitting use of single stage devices. A further object is to provide such devices which can incorporate image intensifiers.

SUMMARY OF THE INVENTION

The apparatus of the invention includes first and second electrodes mounted in spaced relation with a gap therebetween, an electric power source connected across the electrodes for attracting electrons toward one electrode and positive charge toward the other depending upon the polarity of the power source, a photoresponsive layer on the first electrode with radiation directed onto the layer through the first electrode producing an electrostatic charge image at the gap directly or through some form of amplification, a plurality electrophoretic particles dispersed in a dielectric liquid in the gap with the particles being selectively deposited at the second electrode as a function of the electrostatic charge image, and an arrangement for illuminating the second electrode to form the visible image. In the preferred embodiment, a light waveguide is provided on the face of the second electrode with light being directed into the waveguide from the edge so that the deposited particles at the second electrode scatter the light producing the visible image.

The invention includes the method of improving an image for viewing including the steps of generating an electric field in a photoresponsive layer and a dielectric liquid, directing radiation onto the layer producing an electrostatic charge image at the liquid, permitting the electrostatic charge image to move electrophoretic particles in the liquid to a viewing plate, and illuminating the viewing plate. Both the apparatus and the method are equally suitable for use with infrared radiation and low level visible light radiation.

BRIEF DESCRIPTION OF THE DRAWING

FIG. 5 is a view similar to that of FIG. 1 showing an alternative embodiment incorporating one form of image intensifier;

FIG. 6 is a view similar to that of FIG. 1 showing an alternative embodiment incorporating another form of image intensifier;

FIGS. 7 and 8 are enlarged partial sectional views of the device of FIG. 6 illustrating two forms of microchannel plates for the device of FIG. 6;

FIG. 9 is a view similar to FIG. 1 showing another embodiment of the invention presently preferred for the visible and near unpared range; and FIG. 10 is a view similar to FIG. 9 showing another embodiment of the invention presently preferred for the middle and far unpared range.

DESCRIPTION OF THE PREFERRED EMBODIMENTS

Figure 1:
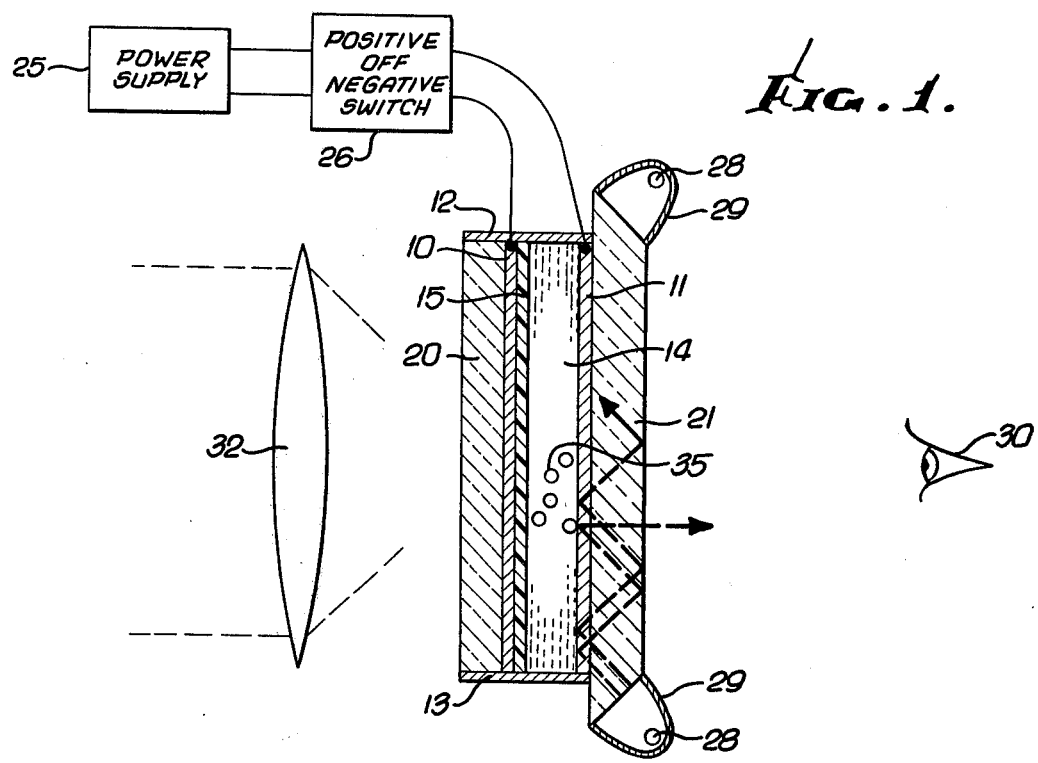
FIG. 1 is a diagrammatic illustration of a viewing system with a viewing chamber in section, incorporating one embodiment of the invention.

The device of FIG. 1 includes electrodes 10, 11 mounted in spaced relation by wall members 12, 13 providing a gap 14 between the electrodes. A photoresponsive layer 15 is carried on the gap face of the electrode 10.

The electrode 10 should be of a material which is substantially transparent to the radiation from the image which is to be viewed, and typically comprises a thin transparent film of an electrical conducting material such as a metal oxide, carried on a glass or plastic support plate 20. The electrode 11 should be substantially transparent at the wavelength which will be used for viewing and may be constructed similarly to the electrode 10, carried on a support plate 21.

Figure 2:
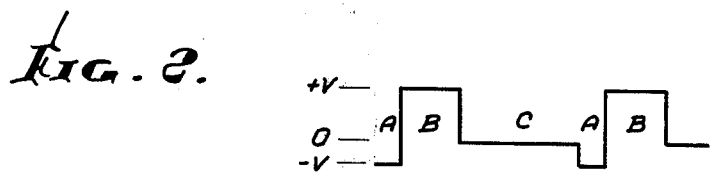
FIG. 2 is a timing diagram for the device of FIG. 1.
Figure 3A:
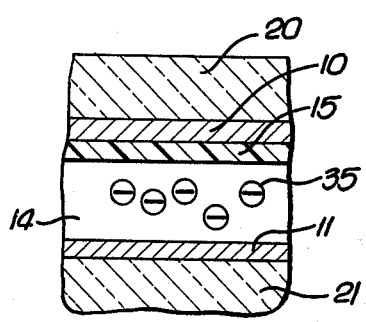
FIGS. 3a–3c are diagrammatic illustrations illustrating the operation of the device of FIG. 1.
Figure 3B:
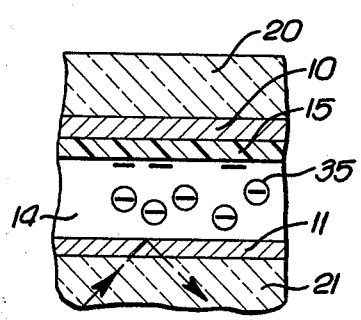

A power supply 25 is connected across the electrodes 10, 11 by a control switch 26 which provides for connecting the power supply with one polarity and with the opposite polarity. A timing diagram for operation of the power supply is shown in FIG. 2, with the invervals A, B and C corresponding to FIGS. 3a, 3b and 3c, respectively.

The system includes means for illuminating the electrode 11 and in the preferred embodiment illustrated in FIG. 1, a source of light, such as a lamp 28 and reflector 29, is provided at an edge of the plate 21. Light sources may be provided at more than one edge if desired. The light is introduced at an angle such that it is reflected from the faces of the plate 21, rather than being transmitted through the faces, with the plate functioning as a light waveguide and providing a dark field to the viewer at 30. The image produced by the device may be viewed directly or through a lens system, may be copied by a camera or a TV system, may be stored or transmitted, or otherwise handled as desired.

In operation, radiation from the image to be viewed is directed through the plate 20 and electrode 10 to the photoresponsive layer 15, typically through a lens 32. In one embodiment, the photoresponsive layer 15 is a photoconductor material which is made selectively electrically conducting by the incoming radiation. Then during time B with the electrode 10 negative and the electrode 11 positive, electrons or negative ions move from the electrode 10 through the layer 15 to the gap surface of the layer, producing an electrostatic charge image with a density variation corresponding to the incoming radiation image.

Figure 3C:
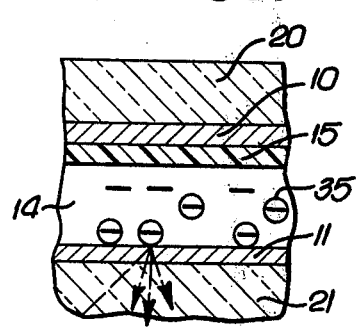

A plurality of electrophoretic particles 35 are suspended in a dielectric liquid in the gap 14. After the externally applied voltage is turned off, the electrostatic charges at the layer 15 produce movement of the particles 35 to selectively deposit particles at the electrode 11, with the deposited particles forming an image corresponding to the electrostatic charge image at the layer 15. This occurs during time C and is illustrated in FIG. 3c.

The deposited particles at the electrode scatter the light which travels through the light guide, producing a visible image. The zones of the electrode which do not have particles deposited remain dark, so that the scattered light is viewed against a dark background. After viewing is completed, a voltage of the reverse polarity is applied across the electrodes to discharge the electrostatic charge image and move the electrophoretic particles from the electrode. This occurs in time A to produce the condition of FIG. 3a. A typical operation cycle may take about 1/10 of a second, producing ten images per second.

In an alternative mode, the photoresponsive layer 15 may be a photoemitter material which produces electrical charges when exposed to radiation.

Figure 4:
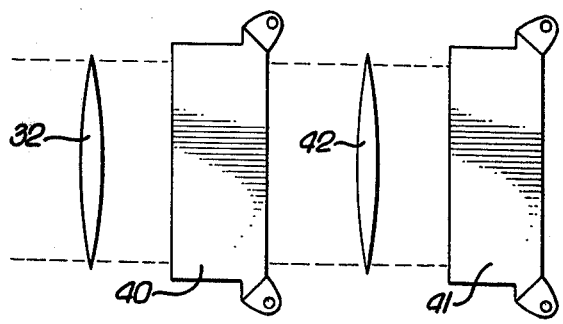
FIG. 4 illustrates two of the viewing devices operated in cascade.

The photoresponsive material 15 should be responsive in the wavelength range which is to be viewed. Similarly, the electrode 10 and support plate 20 should be substantially transparent in this band. Similarly, the electrode 11 and the support plate 21 should be substantially transparent in the wave band used for viewing, which need not be the same as that of the image being viewed. The device may be used as a dark viewing device for operation at night, with the layer 15 operating in the infrared range, while the viewing radiation from the lamps 28 operate in the visible range at a wavelength providing optimum gain. With devices of this type, low noise stages with gain in the order of 10,000 appear readily achievable. In another mode, the device may be used for viewing with low levels of visible light, with the layer 15 responsive in the visible range or some portion thereof. The device may be made selective for various wave bands, by having the layer 15 and associated electrode 10 and support plate 20 with a first pass band and the electrode 11 and plate 21 with a second pass band.

Where greater gain is desired, two or more of the devices may be operated in cascade, as illustrated in FIG. 4 wherein a lens 32 directs incoming radiation onto a first unit 40, with the output of the first unit directed onto a second unit 41 via another lens 42. The units 40, 41 may be the same as the unit illustrated in FIG. 1, however the responsive ranges do not have to be the same. By way of example, the unit 40 could be responsive in the infrared range and produce an output in the visible range, with the unit 41 responsive in the visible range and producing an output in the same or another visible band.

Electrophoretic particles and liquid dispersions are not new per se. Typical examples of particles and dispersions are given in U.S. Pat. No. 3,668,106, and the use of electrophoretic particles with dark field illumination to provide a visible image is shown in U.S. Pat. No. 3,965,352. A particle may comprise a metallic oxide pigment or a carbon pigment or titanium oxide coated with a colorless resin to provide the bulk and for controlling the charge. While negatively charged particles have been illustrated in the preceding discussion, positively charged particles and neutral particles may also be utilized. Typically the particles are of the order of 1 micron in diameter and dispersed in the diluent in the ratio of approximately 1% by weight. Isopar and other inert dielectric liquids are suitable dispersant liquids.

The conventional image intensifier may be utilized in the device of the present invention and two configurations are shown in FIGS. 5 and 6. In the embodiment of FIG. 5, a vacuum chamber 45 and a pin matrix 46 are positioned between the layer 15 and the gap 14. An electrode 47 with a small aperture 48 is positioned in the chamber 45 intermediate the layer 15 and pin matrix 46. The chamber 45 and pin matrix 46 form an electron optical system which functions in the same manner as in the conventional image intensifier, reproducing the electrostatic charge image of the layer 15 at the gap face of the pin matrix 46 with an increase in the charge density.

In the embodiment of FIG. 6, a microchannel plate 51 is positioned between the layer 15 and the gap 14. In the microchannel plate illustrated in FIG. 7, a plurality of small transverse channels 52 are provided in an insulator plate 53, with a dielectric layer 54 at the gap surface of the plate. A vacuum is maintained in the passages in the plate. An alternative construction is shown in FIG. 8 with the output ends of the passages 52 carrying a conducting plug 55. The microchannel plates function in the conventional manner to produce electron amplification and transfer the electrostatic image from the layer 15 to the gap 14.

Another alternative and the presently preferred embodiment for operation in the visible and near infrared range is shown in FIG. 9, where elements corresponding to those of the earlier figures are identified by the same reference numerals. First and second microchannel plates 60, 61 are positioned side by side between the electrodes 10, 11. The microchannel plates may be conventional in design, with passages in the order of 10 microns diameter. A gap 62 is provided under a vacuum between the plate 60 and the electrode 10 with the photoresponsive layer 15 the electrode. In this embodiment, the layer 15 is a photoemitter, and the gap 62 provides for proximity focusing of electrons moving from the photoemitter to the microchannel plate 60. Electrical conductive coatings are provided on both faces of the plate 60 to serve as electrodes for connection to a voltage source. The electrode on each face of the plate 60 typically is a thin film conductor such as chromium, with a resistance in the order of 30 to 40 ohms. The electrode on the right face is connected to circuit ground, the electrode on the left face is connected to a negative potential such as 800 volts, and the electrode 10 is connected to a greater negative potential, such as 1,000 volts. A dielectric layer 63 is provided on the plate 61 at the gap 14.

The microchannel plate 60 with the applied voltage serves as an electron amplifier. The microchannel plate 61 does not have conductive surfaces and serves as an insulating spacer, separating the dielectric 63 from the amplifying microchannel plate 60. The plate 61 normally has a certain amount of conductivity due to its method of manufacture. The surface resistance typically is in the order of $3 \times 10^{13}$ ohm cm. This slight conductivity is useful in preventing electrostatic charge buildup on the plate which would tend to distort the desired field. Other, usually more complex, arrangements can be used to discharge the plate, but the inherent conductivity is preferred. The two plates may be spaced a small distance from each other for reducing problems resulting from misalignment of the channels in the plates. The electrode 11 is connected to a power source through a single pole double throw switch 65, which switch is cycled at the viewing frequency, typically 1 to 10 hertz, to alternately connect the electrode to a positive potential and a negative potential, typically + and − 100 volts, respectively. Various materials are suitable for the dielectric layer 63, including sapphire and silica. The support plate 20 may be of glass or alternatively other materials may be utilized, such as sapphire and silica. Also a fiberoptic plate may be utilized if desired.

Some means is provided at the surface of the dielectric layer 63 adjacent the gap 14 for discharging the electrostatic charge which builds up at this surface. In one embodiment, the surface is periodically connected to circuit ground through a switch. Another and presently preferred arrangement is disclosed in the copending application entitled image charge relaxation in electrophoretic displays, Ser. No. 800,025, filed May 24, 1977 now U.S. Pat. No. 4,104,520. When using the discharge technique of the aforesaid application, a connection is made via line 66 from the gap surface of the dielectric layer 63 to circuit ground.

In operation, the radiation conducted through the plate 20 to the photoemitter layer 15 produces an electron image which is proximity focused on the left or input face of the microchannel plate 60. The plate intensifies the electron image by a gain factor dependent on the voltage across the plate. The electrons which are multiplied and accelerated in the microchannel plate 60 are focused through the channels in the microchannel plate 61 and produce an electrostatic charge image at the dielectric sheet 63 with an intensity pattern corresponding to the incoming radiation at the window 20. This electrostatic image then produces movement of the electrophoretic particles in the manner previously described. Viewing takes place with the switch 65 connecting one polarity to the electrode 11 and the visible image formed by the electrophoretic particles is discharged when the switch 65 is moved to the opposite polarity. The voltage polarity which produces the visible image depends on the polarity of the toner particles and in this embodiment, neutral toner particles are not satisfactory.

A variation of the embodiment of FIG. 9 particularly suitable for use with radiation in the middle and far infrared range is shown in FIG. 10, where elements corresponding to those of FIG. 9 are identified by the same reference numerals. In this embodiment, the photoresponsive layer 15 conprises two layers, the first being a photoconductor 15a and a second being a photoemitter 15b, with a small potential, typically 5 volts applied between the electrode 10 and the junction surface of the layers 15a, 15b.

The operation is substantially the same as that of the embodiment of FIG. 9, with the photoconductor layer 15a selected to be responsive to the radiation of interest. Then selective conduction through the layer 15a produces electron emission by the layer 15b through the gap 62 to the microchannel plate 60.

A variety of photoresponsive materials are presently available. Typical photoemitter material for the visible and near infrared range include S1: Ag-O-Cs; S25: Sb-K-Na-Cs; and GaAs.

Typical photoconductor material for the middle infrared range include PbS; PbSe; PbTe; and InSb. Typical photoconductor material for the far infrared range include Ge: Au; Ge: Au, Zn; and HgCdTe. Typical photoemitter material for use with the middle and far infrared photoconductors include Ge; Au; Ge; Zn; and GeSb.

I claim:
1. In a viewing system, the combination of:
first and second electrodes;
means for supporting said electrodes in spaced relation with a gap therebetween;
means for connecting an electric power source across said electrodes for attracting electrons toward one electrode and positive charge toward the other depending upon the polarity of the power source;
a photoresponsive layer on the inner face of said first electrode, with radiation directed onto said layer through said first electrode producing an electrostatic charge image at said gap; and
a plurality of electrophoretic particles dispersed in a dielectric liquid in said gap, with said particles being selectively deposited at said second electrode as a function of said electrostatic charge image.

2. A system as defined in claim 1 wherein said layer is responsive to radiation in the visible range.

3. A system as defined in claim 1 wherein said layer is responsive to radiation in the infrared range.

4. A system as defined in claim 1 wherein said layers is a photoconductor material.

5. A system as defined in claim 1 wherein said layer is a photoemitter material.

6. The system as defined in claim 1 including:
a light waveguide on the face of said second electrode away from said gap; and
means for directing light into said waveguide with the deposited particles at said second electrode scattering the light producing a visible image.

7. The system as defined in claim 1 wherein said first electrode includes means providing a first radiation pass band, and said second electrode includes means providing a second radiation pass band.

8. The system as defined in claim 1 wherein said means for connecting the power source provides conditions of power on of one polarity for image formation, and power on of the opposite polarity for image dispersal.

9. A system as defined in claim 1 including an image intensifier between said photoresponsive layer and said gap.

10. The system as defined in claim 9 wherein said image intensifier includes a pin matrix at said gap, and
a vacuum chamber with an intermediate apertured electrode and positioned between said layer and pin matrix.

11. The system as defined in claim 9 wherein said image intensifier includes a microchannel plate with a vacuum in the channels and a dielectric at the gap end of the channels.

12. The system as defined in claim 9 wherein second image intensifier includes a first amplifying microchannel plate and a second insulating microchannel plate,
with (said first plate spaced from said photoresponsive layer to provide) an electron proximity focusing there between,
means for connecting an electrical power source across said first plate, and
a dielectric layer at the gap surface of said second plate.

13. The system as defined in claim 12 wherein said photoresponsive layer is a photoemitter.

14. The system as defined in claim 12 wherein said photoresponsive layer is a first photoconductor layer and a second photoemitter layer.

15. The system as defined in claim 9 wherein said image intensifier includes a microchannel plate with a conducting plug in each channel and a vacuum between said plug and said layer.

16. In a viewing system, the combination of:
first and second units, each unit including in combination:
first and second electrodes;
means for supporting said electrodes in spaced relation with a gap therebetween;
means for connecting an electrical power source across said electrodes for attracting electrons toward one electrode and positive ions toward the other depending upon the polarity of the power source;
a photoresponsive layer on the inner face of said first electrode, with radiation directed onto said layer through said first electrode producing an electrostatic charge image at said gap;
a plurality of electrophoretic particles dispersed in a dielectric liquid in said gap, with said particles being selectively deposited at said second electrode as a function of said electrostatic charge image; and
means for illuminating said second electrode forming a visible image;
with said units positioned in cascade with the output of said first unit directed as the input to said second unit.

17. A system as defined in claim 16 wherein said layer of said first unit is responsive in a first pass band and said layer of said second unit is responsive in a second pass band.

18. A system as defined in claim 16 wherein said means for illuminating includes a light waveguide on the face of said second electrode away from said gap, and means for directing light into said waveguide with the deposited particles at said second electrode scattering the light producing the visible image.

19. A system as defined in claim 16 wherein said means for connecting the power source provides conditions of power on of one polarity for image formation, and power on of the opposite polarity for image dispersal.

20. A method of improving an image for viewing, including the steps of:
generating an electric field in a photoresponsive layer and a dielectric liquid;
directing radiation onto the photoresponsive layer producing an electrostatic image at the liquid with a density variation corresponding to the incoming radiation pattern, with the electrostatic charge image selectively moving electrophoretic particles in the liquid to a viewing plate;
illuminating the viewing plate; and
changing the electric field dispersing the electrophoretic particles.

21. The method as defined in claim 20 including illuminating the viewing plate with a dark field directing light onto the viewing plate from an edge, with the particles at the viewing plate scattering the light.

22. The method as defined in claim 20 including repeating the steps using the visible image at the first viewing plate as the input radiation for the second layer.

23. The method as defined in claim 22 including selecting the first layer to be responsive in a first pass band and selecting the second layer to be responsive in a second pass band.

24. The method as defined in claim 20 including directing radiation in the infrared range onto the photoresponsive layer.

25. The method as defined in claim 20 including directing radiation in the visible range onto the photoresponsive layer.